(12) United States Patent
Kumar et al.

(10) Patent No.: US 11,386,421 B2
(45) Date of Patent: Jul. 12, 2022

(54) SYSTEMS AND METHODS FOR PERFORMING PUSH TRANSACTIONS

(71) Applicant: VISA INTERNATIONAL SERVICE ASSOCIATION, Foster City, CA (US)

(72) Inventors: Satish Kumar, Foster City, CA (US); Debabrata Samantaray, Singapore (SG); Bibin Balakrishnan Nair, Singapore (SG); Ajit Kumar Sahu, Singapore (SG); Kaushik Gopalakrishnan, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 206 days.

(21) Appl. No.: 16/078,387

(22) PCT Filed: Apr. 19, 2016

(86) PCT No.: PCT/US2016/028276
§ 371 (c)(1),
(2) Date: Aug. 21, 2018

(87) PCT Pub. No.: WO2017/184121
PCT Pub. Date: Oct. 26, 2017

(65) Prior Publication Data
US 2019/0050853 A1    Feb. 14, 2019

(51) Int. Cl.
*G06Q 20/36* (2012.01)
*G06Q 20/08* (2012.01)
(Continued)

(52) U.S. Cl.
CPC ......... *G06Q 20/3674* (2013.01); *G06Q 20/08* (2013.01); *G06Q 20/10* (2013.01);
(Continued)

(58) Field of Classification Search
CPC .. G06Q 20/3674; G06Q 20/08; G06Q 20/385; G06Q 20/10; G06Q 20/38; G06Q 20/4014; G06Q 20/405; G06Q 20/4097
See application file for complete search history.

(56) References Cited

U.S. PATENT DOCUMENTS

| | | |
|---|---|---|
| 5,280,527 A | 1/1994 | Gullman |
| 5,613,012 A | 3/1997 | Hoffman |

(Continued)

FOREIGN PATENT DOCUMENTS

| | | |
|---|---|---|
| EP | 1028401 A2 | 8/2000 |
| EP | 2156397 A1 | 2/2010 |

(Continued)

OTHER PUBLICATIONS

PCT/US2016/028276, "International Search Report and Written Opinion", dated Jan. 10, 2017, 13 pages.

(Continued)

*Primary Examiner* — John W Hayes
*Assistant Examiner* — Ari Shahabi
(74) *Attorney, Agent, or Firm* — Kilpatrick Townsend & Stockton LLP

(57) ABSTRACT

Embodiments of the invention are directed to systems and methods for pushing tokenized payments to resource providers for goods or services, after the goods or services are received. A user may make a transaction request including a credential and a resource provider ID (e.g., a resource provider location) via a server computer. The server computer may generate a token corresponding to the credential and transmit it to the resource provider using the resource provider ID. Upon receiving the token, the resource provider may enter a transaction amount and send it with the token in an authorization request message. The transaction can then be processed according to standard transaction processing (Continued)

methods, as if the resource provider had initiated the transaction request.

2 Claims, 5 Drawing Sheets

(51) Int. Cl.
    *G06Q 20/38*          (2012.01)
    *G06Q 20/10*          (2012.01)
    *G06Q 20/40*          (2012.01)
(52) U.S. Cl.
    CPC ........... *G06Q 20/38* (2013.01); *G06Q 20/385*
            (2013.01); *G06Q 20/405* (2013.01); *G06Q*
            *20/4014* (2013.01); *G06Q 20/4097* (2013.01)

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |

(56) References Cited

U.S. PATENT DOCUMENTS

| | | |
|---|---|---|
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,571,986 B2 | 10/2013 | Dooley Maley et al. |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0198617 A1 | 8/2009 | Soghoian et al. |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |

(56) References Cited

U.S. PATENT DOCUMENTS

| | | |
|---|---|---|
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0106674 A1* | 5/2011 | Perlman ............... G06Q 20/40 705/30 |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0166295 A1* | 6/2012 | Loevenguth ......... G06Q 20/206 705/17 |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |

(56) References Cited

U.S. PATENT DOCUMENTS

| | | |
|---|---|---|
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0129428 A1 | 5/2014 | Tyler et al. |
| 2014/0143137 A1 | 5/2014 | Carlson |
| 2014/0149293 A1 | 5/2014 | Laracey |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2014/0379575 A1 | 12/2014 | Rogan |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0058220 A1 | 2/2015 | Cazanas et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0055322 A1* | 2/2016 | Thomas .............. H04L 63/0876 726/7 |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200150 A1* | 7/2017 | Cohn ............... G06Q 20/38215 |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0228728 A1 | 8/2017 | Sullivan |
| 2017/0236113 A1 | 8/2017 | Chitalia |
| 2017/0293914 A1 | 10/2017 | Girish |
| 2017/0295155 A1 | 10/2017 | Wong et al. |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |

(56) References Cited

U.S. PATENT DOCUMENTS

| | | |
|---|---|---|
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |
| 2019/0147439 A1 | 5/2019 | Wang |
| 2019/0356489 A1 | 11/2019 | Palanismy |
| 2019/0384896 A1 | 12/2019 | Jones |
| 2019/0392431 A1 | 12/2019 | Chitalila |
| 2020/0267153 A1 | 8/2020 | Kang |
| 2020/0314644 A1 | 10/2020 | Dean |

FOREIGN PATENT DOCUMENTS

| | | |
|---|---|---|
| KR | 20160015375 | 2/2016 |
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

IN201847042556, "First Examination Report", dated Jun. 3, 2021, 6 pages.

\* cited by examiner

SYSTEMS AND METHODS FOR PERFORMING PUSH TRANSACTIONS

CROSS REFERENCE TO RELATED APPLICATIONS

This application is the US national stage of PCT/US2016/028276, filed Apr. 19, 2016, the disclosure of which is incorporated herein by reference in its entirety.

BACKGROUND

There are instances in which a consumer may want to pay for goods or services without knowing the final amount of the transaction. For example, a consumer may want to preauthorize a payment amount for gas or for a meal to provide assurance that they will indeed pay for the gas or meal, even though they may not know the final cost. Further, a consumer may want to pay for the goods or services while still protecting sensitive account information, such as a primary account number (PAN). Thus, a consumer may want to minimize the number of parties having access to the sensitive information, or eliminate access to the sensitive information altogether. Systems and methods for allowing consumers to push payments to merchants in a safe and secure manner are needed.

Embodiments of the invention address this and other problems, individually and collectively.

SUMMARY

According to one embodiment of the invention, a method is provided. The method comprises receiving, at a server computer from a communication device, a transaction request including a credential and a resource provider ID associated with a resource provider computer. The method further comprises transmitting a token corresponding to the credential to the resource provider computer using the resource provider ID, wherein a transaction input value is entered into the resource provider computer after the token is received at the resource provider computer. The method further comprises receiving the token and the transaction input value, and processing the transaction request in accordance with the transaction input value.

According to one embodiment of the invention, another method is provided. The method comprises providing, by a resource provider computer to a communication device, transaction data including a resource provider ID associated with the resource provider computer, wherein the communication device thereafter sends a transaction request including a credential and the resource provider ID to a server computer. The method further comprises receiving, by the resource provider computer, a token corresponding to the credential from the server computer, wherein the server computer sends the token to the resource provider computer using the resource provider ID. The method further comprises sending, by the resource provider computer, a transaction input value and the token to the server computer, wherein the server computer thereafter processes the transaction request in accordance with the transaction input value.

Embodiments of the invention are further directed to a server computer comprising a processor and a memory coupled to the processor. The memory can store instructions, executable by the processor, for implementing the above described methods.

These and other embodiments of the invention are described in further detail below.

DETAILED DESCRIPTION

Figure 1:
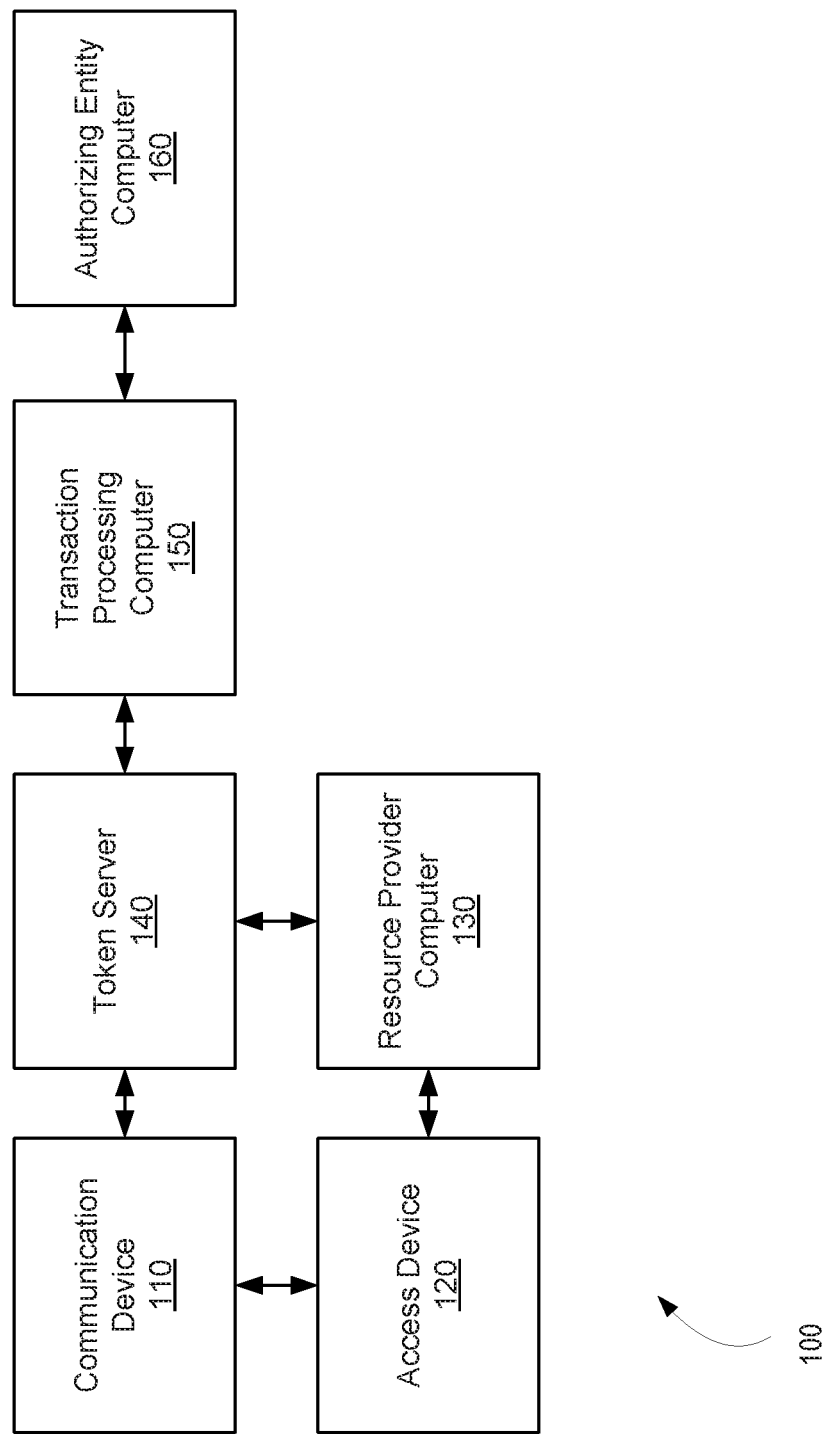
FIG. 1 shows a block diagram of a system according to embodiments of the present invention.

Embodiments of the invention are directed to systems and methods for pushing tokenized payments to resource providers for goods or services, after the goods or services are received. A user may make a transaction request including a credential and a resource provider ID (e.g., a resource provider location) via a server computer. The server computer may generate a token corresponding to the credential and transmit it to the resource provider using the resource provider ID. Upon receiving the token, the resource provider may enter a transaction amount and send it with the token in an authorization request message. The transaction can then be processed according to standard transaction processing methods, as if the resource provider had initiated the transaction request. In one embodiment, before providing the token to the resource provider, the server computer initiates preauthorization for a capped amount using the credential, which ensures that a transaction amount entered by a resource provider that is over the capped amount is declined. This reduces the risk of fraud by the resource provider.

Before discussing specific embodiments and examples, some descriptions of terms used herein are provided below.

An "authorization request message" may be a message that requests authorization for a particular event. For example, an authorization request message may request authorization to perform a payment transaction. In some embodiments, an authorization request message may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. . . . An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "digital wallet" can include an electronic application or device that allows an individual to conduct electronic transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/ or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "resource provider ID" may be any identifier associated with a resource provider. The identifier may be any combination of letters, numbers, symbols, and/or images, such as a code. A resource provider ID may include or indicate a location associated with a resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "transaction input value" can include any parameter of a transaction, including any unit of data or information. For example, a transaction input value may include an amount of money, a type of transaction, a particular resource provider, a type of resource provider, etc.

FIG. 1 shows a block diagram of a system 100 according to embodiments of the present invention. The system 100 includes a communication device 110, an access device 120, a resource provider computer 130, a token server 140, a transaction processing computer 150, and an authorizing entity computer 160. Each of these systems and computers may be in operative communication with each other. The communication device 110 may be operated by a user (not shown).

Communication device 110 may be any device suitable to carry out a financial transaction or any other additional related actions. Communication device 110 may include a memory that may store a digital wallet application or payment application. The application may be provisioned with a credential to enable communication device 110 to conduct transactions. Communication device 110 may also include a secure element that can be implemented in either hardware and/or software, which may store sensitive account or personal information. Communication device 110 may communicate over a communication network with one or more entities, including access device 120 and token server 140.

In embodiments in which communication device 110 includes a digital wallet application, communication device 110 may further be in communication with a service provider computer that may be operated or associated with an application provider (not shown). The application provider may be an entity that provides the digital wallet application to communication device 110 for use by a user. The service provider computer may maintain one or more digital wallets for each user, and each digital wallet may be associated with credentials for one or more payment accounts. Examples of digital wallets may include Visa Checkout™ or Google™ Wallet, etc. The service provider computer may send and receive over-the-air (OTA) messages to a digital wallet application stored on the communication device 110. The service provider computer may include a processor and a computer readable medium coupled to the processor, the computer readable medium comprising code, executable by the processor for performing the disclosed digital wallet functionalities.

Access device 120 may be any suitable device that provides access to an external device, such as, in one example, resource provider computer 130. An access device may generally be located in any suitable location, such as at the location of a resource provider. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, web interfaces, and the like. Access device 120 may use any suitable contact or contactless mode of operation to send or receive data from, or associated with, communication device 110. In some embodiments, where access device 120 may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, access device 120 may be part of resource provider computer 130.

The resource provider computer 130 may be configured to receive transaction data from access device 120. Resource provider computer 130 may enable a resource provider such as a merchant to engage in transactions, sell goods or services, or provide access to goods or services to the consumer. The resource provider computer 130 may accept multiple forms of payment and may use multiple tools to conduct different types of transactions. For example, the resource provider computer 130 may communicate with, include, or be an access device 120 at a physical store operated by the merchant for in-person transactions. The resource provider computer 130 may also enable the merchant to sell goods and/or services via a website, and may accept payments over the Internet.

Token server 140 may comprise a server computer to facilitate performance of the token management functions described herein. The server computer may include a processor and a computer readable medium coupled to the processor, the computer readable medium comprising code, executable by the processor.

In some embodiments, token server 140 may include a token generation module that can generate and/or provide a "payment token" that is associated with sensitive data (e.g., credentials). For example, the token generation module may generate a payment token that can be used as a substitute for a real account identifier (e.g., a Primary Account Number (PAN) of an account), and maintain a stored association (e.g., mapping) between the payment token and the PAN, such that a token exchange module is able to "translate" the payment token back to the original PAN. In some embodiments, the payment token is mathematically derived from the original PAN. In other embodiments, the payment token is randomly generated with respect to the original PAN, and is simply linked to it in a data table. Regardless of how the payment token is generated from the PAN and vice versa, the use of a payment token instead of a real account identifier during a transaction can provide enhanced security. In some embodiments, the payment token and/or information regarding the payment token may be stored in a token vault. These functionalities are described further herein with respect to FIG. 5.

In some embodiments, a transport computer (not shown) is provided between the resource provider computer 130 and the transaction processing computer 150. The transport computer may be associated with an acquirer. An "acquirer" may typically be a business entity (e.g., a commercial bank) that has a business relationship with a particular resource provider (e.g., merchant) or other entity. Some entities can perform both issuer and acquirer functions. Some embodiments may encompass such single entity issuer-acquirers.

The transaction processing computer 150 may be associated with one or more payment service providers. The transaction processing computer 150 may also comprise a server computer. The server computer may include a processor and a computer readable medium coupled to the processor, the computer readable medium comprising code, executable by the processor.

The authorizing entity computer 160 may communicate with the transaction processing computer 150 to conduct transactions. The authorizing entity computer 160 may comprise a server computer. The server computer may include a processor and a computer readable medium coupled to the processor, the computer readable medium comprising code, executable by the processor.

The authorizing entity computer 160 is typically run by a business entity (e.g., a bank) that may have issued the payment (credit/debit) card, credentials or payment tokens used for the transactions. Some systems can perform both authorizing entity computer 160 and transport computer (not shown) functions. When a transaction involves a payment account associated with the authorizing entity computer 160, the authorizing entity computer 160 may verify the account and respond with an authorization response message to the transport computer (not shown) that may be forwarded to the corresponding access device and the consumer device if applicable.

At a later time (e.g., at the end of the day), a clearing and settlement process can occur between the transport computer (not shown), the transaction processing computer 150, and the authorizing entity computer 160.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

Figure 2:
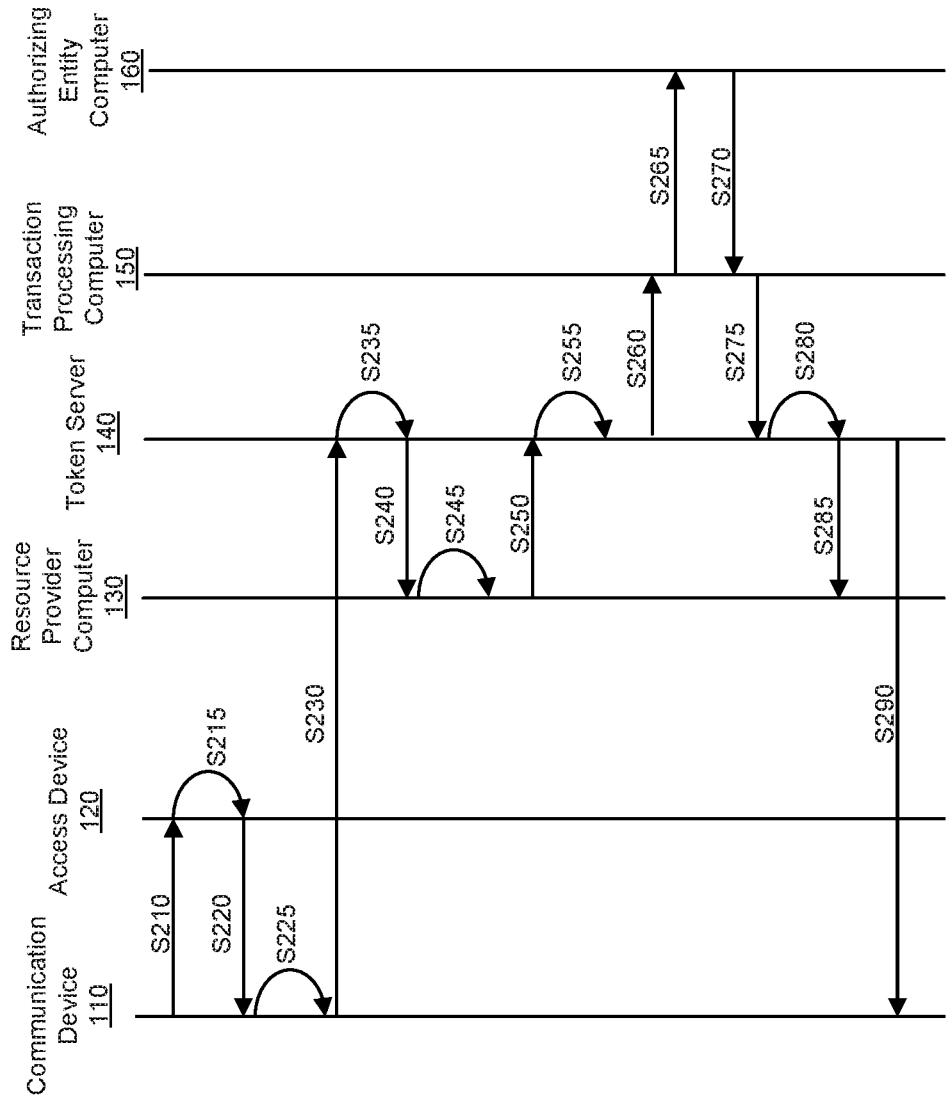
FIG. 2 shows a flowchart of a method for performing push transactions according to embodiments of the present invention.

FIG. 2 shows a flowchart of a method for performing push transactions according to embodiments of the present invention. FIG. 2 includes communication device 110, access device 120, resource provider computer 130, token server 140, transaction processing computer 150, and authorizing entity computer 160, of FIG. 1.

At step S210, a user of communication device 110 initiates a transaction with access device 120. The transaction may be, for example, for goods or services provided by a resource provider associated with access device 120. The communication device 110 does not initiate the transaction with access device 120 in response to a communication from the access device 120 or the resource provider associated with the access device 120. For example, the communication device 110 may request information from access device 120 that would allow communication device 110 to request that a payment request be pushed to the resource provider for the goods or services, without previously receiving a request for payment from the access device 120. In one embodiment, communication device 110 initiates the transaction with access device 120 using a digital wallet application, as described further herein. Communication device 110 may initiate the transaction with access device 120 by requesting information through a wired communications link or a wireless communications link (e.g., using NFC, WiFi or a cellular network).

At step S215, access device 120 generates or accesses a resource provider ID for the resource provider associated with access device 120. The resource provider ID may be in any suitable form, such as in any combination of letters, numbers, symbols, and/or images, and may be included in a code, such as a QR code, a bar code, or any other scannable or interpretable code. The resource provider ID may include a name of the resource provider, a location of the resource provider, and/or contact information for the resource provider, in one embodiment. The contact information may include an IP address, e-mail address, or other electronic identifier of the resource provider computer 130 in one embodiment. For example, at step S215, access device 120 may be a web interface that generates and displays a QR code encoding a resource provider name and IP address to be used by communication device 110 to request that a payment request be pushed to the resource provider.

At step S220, access device 120 sends the resource provider ID (or the code including the resource provider ID) to communication device 110. At step S225, communication device 110 extracts the resource provider ID, when provided in an encoded format. For example, communication device 110 may decode or otherwise interpret the code to extract the underlying resource provider ID. At step S230, communication device 110 sends a transaction request to token server 140 including the resource provider ID and a credential with which the user of communication device 110 would like to complete the transaction. For example, the transaction request may be a request to push a payment to resource provider computer 130 for goods or services using a particular PAN.

At step S235, token server 140 determines whether a token exists for the credential, and either accesses the token associated with the credential if the token already exists, or generates a new token associated with the credential if the token does not already exist. At step S240, token server 140 pushes the token to resource provider computer 130 using the resource provider ID provided to it by communication device 110. For example, token server 140 may send a message to resource provider computer 130 including the token that notifies resource provider computer 130 that a payment using the token is ready to be accepted by the resource provider computer 130.

At step S245, resource provider computer 130 enters a transaction input value and generates an authorization request message with the token and the transaction input value. The transaction input value may be, for example, a payment amount for the goods or services provided to the user associated with communication device 110. In other words, for example, the resource provider computer 130 may enter the payment amount after the transaction has been initiated by the user, and in one embodiment, after the goods or services have already been provided to the user. At step S250, resource provider computer 130 transmits the authorization request message including the token and the transaction input value to token server 140. The authorization request message may then be processed as a pull payment transaction.

At step S255, token server 140 locates the credential associated with the token, and replaces the token with the credential in the authorization request message. At step S260, token server 140 sends the authorization request message including the transaction input value and the credential to transaction processing computer 150, for further processing. Transaction processing computer 150 determines the authorizing entity associated with the credential, then at step S265 forwards the authorization request message including the transaction input value and the credential to the authorizing entity computer 160 for verification and authorization.

Once the transaction is authorized, the authorizing entity computer 160 may generate an authorization response message including the credential, and may transmit the authorization response message to transaction processing computer 150 at step S270. At step S275, the transaction processing computer 150 may forward the authorization response message to the token server 140. Upon receipt, the token server 140 may replace the credential in the authorization response message with its associated token at step S280.

At step S285, token server 140 may send the authorization response message including the token to resource provider computer 130 to indicate that the transaction was completed according to the transaction input value (e.g., for the entered amount). At step S290, a notification is sent by token server 140 to communication device 110 indicating that the transaction was completed. The notification may include the transaction input value entered by resource provider computer 130, since this value may not have been previously provided to communication device 110.

At a later point in time (e.g., at the end of the day), a clearing and settlement process can be conducted between the transaction processing computer 150, the authorizing entity computer 160, and the transport computer (not shown) associated with resource provider computer 130. The resource provider computer 130 may first provide a file with the token and the associated transaction data (e.g., the transaction input value) to the transport computer. The transport computer may then transmit any clearing and settlement messages to the transaction processing computer 150 using the token. The token may then be converted to the credential as described above to facilitate the exchange of messages and the transfer of funds between the transport computer and the authorizing entity computer 160.

In other words, systems and methods according to an embodiment of the invention may be used to allow a user of a communication device to initiate a push payment transaction with a resource provider. The resource provider, instead of the user, may specify the payment amount for the transaction after the transaction has been initiated by the user, and in one embodiment, after the goods or services have already been provided to the user. The transaction may then be processed as a pull payment transaction.

A number of advantages are provided by processing transactions in this manner. For example, because the user initiates the transaction request, the user's PAN or other credential is protected from the merchant, as it is never provided to the merchant. In addition, the user can initiate payment to a remote merchant after receiving delivery of goods, whereas the merchant may otherwise not know the exact timing of delivery to request payment and/or may have no other means of accepting payment upon delivery (e.g., because deliverymen are not usually capable of processing payments). Because the transaction is ultimately processed as a pull payment transaction, little or no infrastructure changes are required by the transaction processing computer and the authorizing entity computer, which may not be configured to handle push payment transactions.

There are also benefits to allowing the resource provider to specify the payment amount after the user initiates the payment transaction. For example, the user never needs to know the exact amount of the payment to request. This is advantageous in situations in which an exact payment amount is complicated (e.g., $1,274.18 instead of $1,000), or in which an exact payment amount is not known at the time of the initiation (e.g., the user initiates payment for hourly maid cleaning services that are not yet completed at the time of initial request; the user initiates payment for dinner at a restaurant, but has not yet specified a tip).

In addition, systems and methods according to an embodiment of the claimed invention reduce processing time for a transaction. For example, if the user or resource provider were to enter a payment amount when initiating the transaction, there would be a delay while the token was generated prior to processing the payment. Instead, because the token is already generated when the resource provider enters the payment amount, the payment can begin processing immediately once the payment amount is entered.

Figure 3:
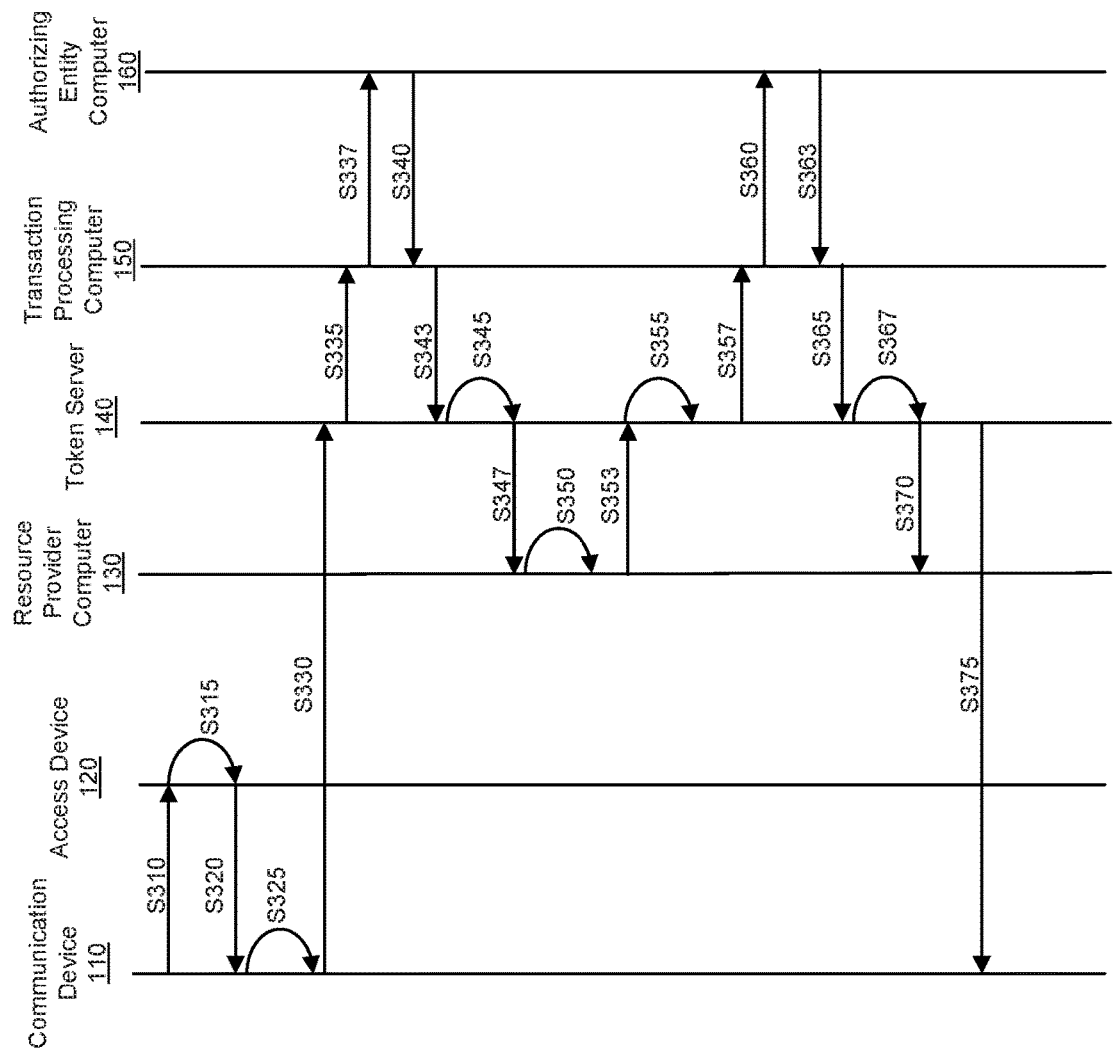
FIG. 3 shows a flowchart of a method for performing push transactions according to embodiments of the present invention.

FIG. 3 shows a flowchart of another method for performing push transactions according to embodiments of the present invention. FIG. 3 includes communication device 110, access device 120, resource provider computer 130, token server 140, transaction processing computer 150, and authorizing entity computer 160, of FIG. 1.

At step S310, a user of communication device 110 initiates a transaction with access device 120. Step S310 may be similar to step S210 as described above. At step S315, access device 120 generates or accesses a resource provider ID. The resource provider ID may be as described above with respect to FIG. 2.

At step S320, access device 120 sends the resource provider ID (or the code including the resource provider ID) to communication device 110. At step S325, communication device 110 extracts the resource provider ID, when provided in an encoded format. At step S330, communication device 110 sends a transaction request to token server 140 including the resource provider ID and a credential with which the user of communication device 110 would like to complete the transaction. For example, the transaction request may be a request to pay resource provider computer 130 for goods or services using a particular credential (e.g., a PAN). Steps S320-S330 may be similar to steps S220-S230 as described above.

At step S335, token server 140 requests preauthorization of a threshold transaction input value (e.g., a capped amount) from transaction processing computer 150 using the credential. The capped amount may be determined according to any of a number of methods. In one embodiment, the capped amount may be specified by communication device 110 in the transaction request sent at step S330. In another embodiment, the capped amount may be set by token server 140. In the latter embodiment, the capped amount may be determined based on a type of resource provider associated with resource provider computer 130, and/or based on a location associated with the resource provider ID. For example, the capped amount may be set at $50 if the resource provider associated with resource provider computer 130 is a coffee shop, while the capped amount may be set at $3,000 if the resource provider is an electronics store. In another example, the capped amount may be set at $500 if the resource provider ID indicates that the resource provider is located in the United States, but may be set at $100 if the resource provider ID indicates that the resource provider is located outside of the United States, to reflect the higher risk of fraud for transactions associated with resource providers located outside of the United States.

At step S337, the transaction processing computer 150 determines the authorizing entity associated with the credential, then forwards the preauthorization request including the threshold transaction input value and the credential to the authorizing entity computer 160 for verification and preauthorization. At step S340, the authorizing entity computer 160 preauthorizes the transaction request, and sends the preauthorization response to the transaction processing computer 150. At step S343, the transaction processing computer 150 sends the preauthorization response including the threshold transaction input value and the credential to the token server 140.

At step S345, token server 140 determines whether a token exists for the credential, and either accesses the token associated with the credential if the token already exists, or generates a new token associated with the credential if the token does not already exist. At step S347, token server 140 sends the token to resource provider computer 130 using the resource provider ID provided to it by communication device 110. For example, token server 140 may send a message to resource provider computer 130 including the token that notifies resource provider computer 130 that a payment using the token is ready to be accepted.

At step S350, resource provider computer 130 enters a transaction input value and generates an authorization request message with the token and the transaction input value. The transaction input value may be, for example, a payment amount for the goods or services provided to communication device 110. At step S353, resource provider computer 130 transmits the authorization request message including the token and the transaction input value to token server 140.

At step S355, token server 140 determines whether the transaction input value is within the threshold transaction input value (e.g., whether the amount entered by resource provider computer 130 is within the capped amount). If the transaction input value is within the threshold, token server 140 locates the credential associated with the token, and replaces the token with the credential in the authorization request message. At step S357, token server 140 sends the authorization request message including the transaction input value and the credential to transaction processing computer 150, for further processing. Transaction processing computer 150 determines the authorizing entity associated with the credential, then at step S360 forwards the authorization request message including the transaction input value and the credential to the authorizing entity computer 160 for verification and authorization.

Once the transaction is authorized, the authorizing entity computer 160 may generate an authorization response message including the credential, and may transmit the authorization response message to transaction processing computer 150 at step S363. At step S365, the transaction processing computer 150 may forward the authorization response message to the token server 140. Upon receipt, the token server 140 may replace the credential in the authorization response message with its associated token at step S367.

At step S370, token server 140 may send the authorization response message including the token to resource provider computer 130 to indicate that the transaction was completed according to the transaction input value (e.g., for the entered amount). At step S375, a notification is sent by token server 140 to communication device 110 indicating that the transaction was completed. The notification may include the transaction input value entered by resource provider computer 130, since this value may not have been previously provided to communication device 110.

At a later point in time (e.g., at the end of the day), a clearing and settlement process can be conducted between the transaction processing computer 150, the authorizing entity computer 160, and the transport computer (not shown) associated with resource provider computer 130. The resource provider computer 130 may first provide a file with the token and the associated transaction data (e.g., the transaction input value) to the transport computer. The transport computer may then transmit any clearing and settlement messages to the transaction processing computer 150 using the token. The token may then be converted to the credential as described above to facilitate the exchange of messages and the transfer of funds between the transport computer and the authorizing entity computer 160.

In addition to those advantages described above, the embodiment of the invention described with respect to FIG. 3 provides a number of additional advantages. For example, by requesting preauthorization for a capped amount, embodiments of the invention guarantee and provide assurance that payment will be available for the resource provider up to that capped amount. In addition, the use of a capped amount reduces the risk of fraud by the resource provider, and/or limits the spending capacity of the resource provider to an expected amount. For example, by limiting resource providers located outside of the United States to $100, the likelihood of fraud is reduced because more fraudulent transactions are associated with foreign resource providers. In another example, by limiting certain types of resource providers to maximum expected amounts (e.g., a coffee shop to $50), those resource providers are not able to fraudulently or accidentally request higher, potentially unjustified payment amounts.

Figure 4:
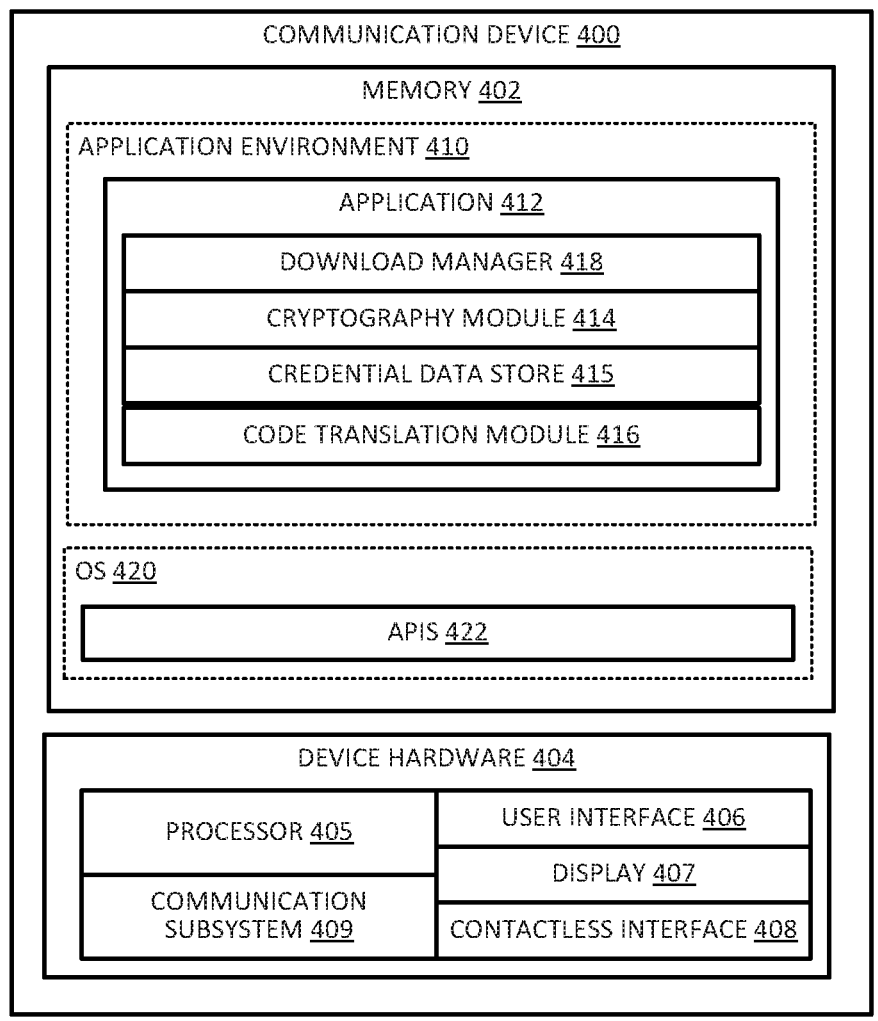
FIG. 4 shows a block diagram of a communication device according to embodiments of the present invention.

FIG. 4 shows a block diagram of a communication device 400 according to embodiments of the present invention. Communication device 400 may be used to implement communication device 110 of FIG. 1, for example. Communication device 400 may include device hardware 404 coupled to a memory 402. Device hardware 404 may include a processor 405, a communications subsystem 409, and a user interface 406. In some embodiments, device hardware 404 may include a display 407 (which can be part of user interface 406). Device hardware 404 may also include a contactless interface 408, for example, in some embodiments in which communication device 400 is a portable communication device. Processor 405 can be implemented as one or more integrated circuits (e.g., one or more single core or multicore microprocessors and/or microcontrollers), and is used to control the operation of communication device 400. Processor 405 can execute a variety of programs in response to program code or computer-readable code stored in memory 402, and can maintain multiple concurrently executing programs or processes. Communications subsystem 409 may include one or more RF transceivers and/or connectors that can be used by portable communication device 400 to communicate with other devices and/or to connect with external networks. User interface 406 can include any combination of input and output elements to allow a user to interact with and invoke the functionalities of communication device 400. In some embodiments, user interface 406 may include a component such as display 407 that can be used for both input and output functions.

Contactless interface 408 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 408. In some embodiments, contactless interface 408 can be accessed by the mobile OS 420 using specialized card emulation APIs 422 without requiring the use of a secure element. In some embodiments, display 407 can also be part of contactless interface 408, and is used, for example, to perform transactions using QR codes, bar codes, etc.

Memory 402 can be implemented using any combination of any number of non-volatile memories (e.g., flash memory) and volatile memories (e.g., DRAM, SRAM), or any other non-transitory storage medium, or a combination thereof media. Memory 402 may store an operating system (OS) 420 and an application environment 410 where one or more applications reside including application 412 to be executed by processor 405. In some embodiments, OS 420 may implement a set of card emulation APIs 422 that can be invoked by application 412 to access contactless interface 408 to interact with an access device.

Application 412 can include an application that uses, accesses, and/or stores sensitive information, such as credentials or tokens. For example, application 412 can include a digital wallet or payment application that uses credentials (e.g., a token and/or payment credentials) to conduct transactions via communication device 400. In some embodiments, access to application 412 by a user can be protected by user authentication data such as a password, passcode, PIN, etc. For example, when a user attempts to launch or execute application 412, the user may be requested to enter valid user authentication data before the user can access application 412. Application 412 may include a download manager 418, a cryptography module 414, a credential (e.g., token and/or payment credentials) data store 415, and/or a code translation module 416. In some embodiments, one or more of these components can be provided by another application or component that is not part of application 412.

Download manager 418 can be programmed to provide functionalities to communicate with an application provider associated with application 412 to download information via the application provider. Download manager 418 working in conjunction with the processor 405 may request or otherwise manage the acquisition and/or storage of credentials. For example, download manager 418 working in conjunction with the processor 405 may request and obtain credentials via the application provider associated with application 412, and store the credentials in credential data store 415. In some embodiments, the credentials provided by the application provider can be received in an encrypted form. For example, the credentials can be encrypted with a session key generated by a server computer. Download manager 418 working in conjunction with the processor 405 may also receive, from the application provider, the session key in an encrypted form, and store the encrypted session key in credential data store 415.

Cryptography module 414 working in conjunction with the processor 405 may provide cryptographic functionalities for application 412. For example, cryptography module 414 may implement and perform encryption/decryption operations for application 412 using encryption algorithms such as DES, AES, TDES, or the like, and/or hash functions such as SHA, or the like. For example, when application 412 accesses credential data store 415 to retrieve and use the credentials stored therein (e.g., to conduct a transaction), application 412 may invoke cryptography module 414 to decrypt the session key that is used to encrypt the stored credentials, and then decrypt the credentials using the decrypted session key. The decrypted credentials can then be used by application 412.

Code translation module 416, in conjunction with processor 405, may receive and translate codes containing underlying data. For example, code translation module 416 may, in conjunction with processor 405, interpret a code (e.g., a QR code, a bar code, etc.) to extract a resource provider ID. The resource provider ID may include a name of the resource provider, a location of the resource provider, and/or contact information for the resource provider, in one embodiment. The contact information may include an IP address, e-mail address, or other electronic identifier of the resource provider computer 130, for example. In one embodiment, the code is scannable by a camera (not shown) contained in device hardware 404 of communication device 400.

Figure 5:
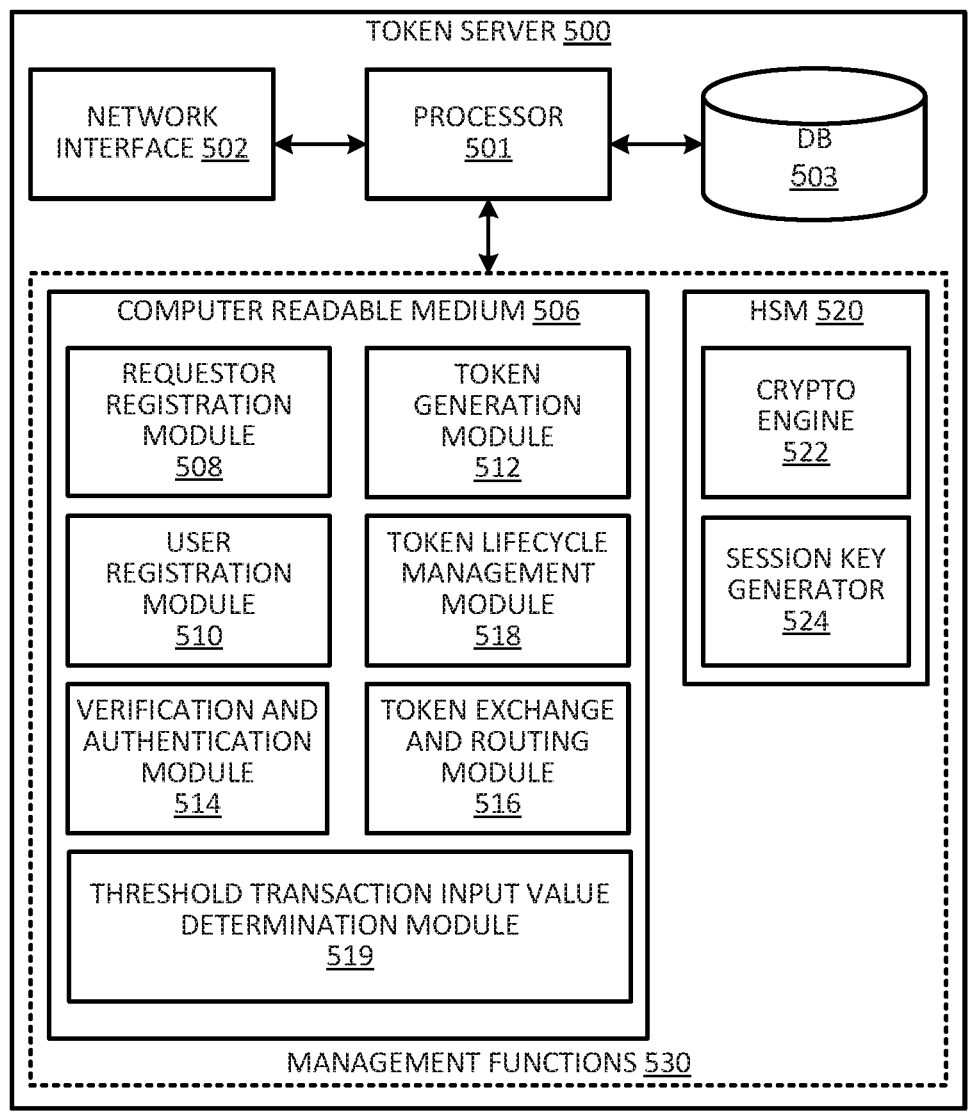
FIG. 5 shows a block diagram of a token server according to embodiments of the present invention.

FIG. 5 illustrates a block diagram of a token server 500 according to embodiments of the present invention. Token server 500 may be used to implement token server 140 of FIG. 1, for example. In some embodiments, one or more token servers 500 can be used, for example, to implement a network token system. Token server 500 may include a processor 501 coupled to a network interface 502 and a computer readable medium 506. In some embodiments, token server computer 500 may also include a hardware security module (HSM) 520. Token server 500 may also include a token database 503 that may be internal or external to token server 500.

Processor 501 may include one or more microprocessors to execute program components for performing the management functions 530 of token server 500. Network interface 502 may be configured to connect to one or more communication networks to allow token server 500 to communicate with other entities such as a communication device operated by a user, an application provider computer or a token request computer, resource provider computer, transport computer, transaction processing network computer, authorizing entity computer, etc. Computer readable medium 506 may include any combination of one or more volatile and/or non-volatile memories, for example, RAM, DRAM, SRAM, ROM, flash, or any other suitable memory components. Computer readable medium 506 may store code executable by the processor 501 for implementing some or all of the management functions 530 of token server 500 described herein. For example, computer readable medium 506 may include a requestor registration module 508, a user registration module 510, a token generation module 512, a verification and authentication module 514, a token exchange and routing module 516, a token life-cycle management module 518, and a threshold transaction input value determination module 519.

Requestor registration module 508 may, in conjunction with processor 501, register a token requestor entity (e.g., application provider) with the token database 503, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 508 such as an entity name, contact information, an entity type (e.g., resource provider, digital wallet provider, payment service provider, authorizing entity, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

User registration module 510 may, in conjunction with processor 501, perform registration of users and accounts of the users. In some embodiments, token server 500 may allow authorized entities to register credentials (e.g., payment or financial accounts) with the network token system on behalf of the users. For example, a registered token requestor may provide a token requestor ID (e.g., received at the time of registration from the requestor registration module 508), a credential or other sensitive information or sensitive information identifier for which a token can substitute, a consumer name and contact information, device identifier of the consumer's communication device, a token type, and any other relevant information for individual account registration or bulk account registration. In some embodiments, user registration module 510 may store the account details and sensitive information in token database 503 for all successful activation and registration requests. In some embodiments, an authorized entity may also unregister users and accounts by providing the necessary information to token server 500.

Token generation module 512 can, in conjunction with processor 501, generate a token or retrieve sensitive information in response to processing a request for a token or sensitive information from a token requestor (e.g., an application provider). In some embodiments, token generation module 512 may receive a token requestor ID and an account identifier or sensitive information identifier. In some embodiments, token generation module 512 may also receive optional information such as a user name, a user address and zip code, a requested token or sensitive information type (e.g., static, dynamic, non-payment, etc.), device identifier, and/or suitable information. In some embodiments, token generation module 512 may, in conjunction with processor 501, generate a response with the requested token or requested sensitive information, a token expiration date associated with the token, and/or a token assurance level associated with the token. In some embodiments, token generation module 512 may, in conjunction with processor 501, validate the token requestor ID and maintain the correlation between the token, the sensitive information or account identifier being substituted by the token, and the associated token requestor. In some embodiments, token generation module 512 may, in conjunction with processor 501, determine if a token already exists in token database 503 for a token request before generating a new token. In some embodiments, if a token cannot be provisioned, the token response may include a corresponding reason code. In some embodiments, token generation module 512 may also, in conjunction with processor 501, provide an interface to the token requestors to submit a bulk token request file.

In some embodiments, the token may be generated on the fly using API calls. For example, when a request is received to tokenize an account identifier or other sensitive information, token generation module 512 may, in conjunction with processor 501, determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. Token database 503 may store the relationship of the token range to the account identifier, and a token add record may be logged. In some embodiments, token generation module 512 may, in conjunction with processor 501, consider the token range list associated with the account identifier range before assigning a token.

Verification and authentication module 514 may, in conjunction with processor 501, execute a consumer verification and authentication process, and determine a token assurance level based on the outcome of the verification and authentication process. For example, the verification and authentication module 514 can perform consumer authentication and verification through a configured authentication scheme. In some embodiments, the authentication scheme may include verification of the account identifier, verification values, and the expiration date based on the customer information stored in a database associated with the transaction processing network. In some embodiments, the authentication scheme may include direct verification of the consumer by the issuer using consumer credentials for their online banking system.

In some embodiments, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give issuers the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the resource providers. In some embodiments, the authentication scheme may include verification of the account using a transaction processing network consumer authentication service (e.g., Visa™ Consumer Authentication Service (VCAS)). For example, the VCAS service can authenticate the consumer on-behalf of the issuer prior to the authorization process.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 516 may, in conjunction with processor 501, process requests for the underlying sensitive information (e.g., a credential) associated with a given token. For example, a transaction processing network, acquirer, issuer, etc. may issue a request for a token exchange during processing of a transaction. Token exchange and routing module 516 may, in conjunction with processor 501, validate that the requesting entity is entitled to make a request for a token exchange. In some embodiments, token exchange and routing module 516 may, in conjunction with processor 501, validate the credential (or other sensitive information) to token mapping and presentment mode based on the transaction timestamp and the token expiration timestamp. Token exchange and routing module 516 may, in conjunction with processor 501, retrieve the credential (or other sensitive information) from token database 503, and provide it along with the assurance level to the requesting entity. In some embodiments, if the credential (or other sensitive information) to token mapping is not valid for the transaction timestamp and presentment mode, an error message may be provided.

Token life-cycle management module 518 may, in conjunction with processor 501, perform life-cycle operations on the tokens managed by token server 500. Life-cycle operations may include canceling a token, activating or deactivating a token, updating token attributes, renewing token with a new expiration date, etc. In some embodiments, a token requestor entity may provide a token requestor ID, a token number, a life-cycle operation identifier and one or more token attributes to token server 500 to perform the requested life-cycle operation on a given token. Token life-cycle management module 518 may, in conjunction with processor 501, verify the token requestor ID and the token association based on information in token database 503. Token life-cycle management module 518 may, in conjunction with processor 501, perform the requested life-cycle operation on a given token, and update the corresponding associations in token database 503. Examples of life-cycle operations may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

Threshold transaction input value determination module 519 may, in conjunction with processor 501, determine a threshold transaction input value for a particular transaction in one embodiment. The threshold transaction input value (e.g., a capped amount) may be determined based on a type of resource provider associated with resource provider computer 130, and/or based on a location associated with the resource provider ID. For example, the capped amount may be set at $50 if the resource provider is a coffee shop, while the capped amount may be set at $3,000 if the resource provider is an electronics store. In another example, the capped amount may be set at $500 if the resource provider ID indicates that the resource provider is located in the United States, but may be set at $100 if the resource provider ID indicates that the resource provider is located outside of the United States. In one embodiment, the threshold transaction input value is determined based on a fraud risk.

According to some embodiments, token server 500 may include a HSM 520 to perform secure functions such as encryption and decryption operations and generation of cryptographic keys used for the encryption and decryption operations. For example, HSM 520 may include a cryptography engine 522 to, in conjunction with processor 501, execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 520 may also implement a session key generator 524 to, in conjunction with processor 501, generate a session key for each token or sensitive information request that token server 500 processes. The generated session key can be used to encrypt a token or sensitive information generated or retrieved for the request, and the token or sensitive information can be provided to the token requestor in an encrypted form. For example, for each request that token server 500 receives and processes, session key generator 524 may, in conjunction with processor 501, generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and token server computer 500. Token generation module 512 may generate or otherwise retrieve a token or sensitive information to fulfill the request. The session key can be used by cryptographic engine 522 to encrypt that token or sensitive information using an encryption algorithm, and the encrypted token or sensitive information can be provided to the token requestor. In some embodiments, the generated session key is also provided to the token requestor with the encrypted token or sensitive information.

Although token server 500 has been described with a HSM implementing only some of their functions, it should be understood that other functionalities of the respective computers (e.g., token generation) can be implemented inside a HSM as well. Furthermore, some or all of the respective HSM functionalities can also be implemented outside of a HSM.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although specific functions and methods have been described with respect to token server 500 in FIG. 5, such functions could be performed by other computers such as the transaction processing computer 150.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
receiving, at a server computer from a communication device operated by a user, a transaction request including a credential and a resource provider ID associated with a resource provider computer, wherein the communication device did not initiate the transaction request in response to a communication from the resource provider computer, and wherein the resource provider ID comprises an identifier code, a location, and an IP address for the resource provider computer;
determining, by the server computer, a threshold transaction input value based on a type of resource provider associated with the resource provider computer and a location associated with the resource provider ID, the location determined based on the resource provider ID;
initiating, by the server computer, preauthorization for the threshold transaction input value using the credential;
transmitting, by the server computer, a token corresponding to the credential to the resource provider computer using the resource provider ID;
receiving, by the resource provider computer, the token;
obtaining, by the resource provider computer, a transaction input value that is entered into the resource provider computer after the token is received at the resource provider computer, wherein the transaction input value is within the threshold transaction input value;
generating, by the resource provider computer, an authorization request message that includes the token and the transaction input value;
transmitting, by the resource provider computer and to a token server, the authorization request message that includes the token and the transaction input value;
obtaining, by the token server, the credential associated with the token;
replacing, by the token server, the token in the authorization request message with the credential;
transmitting, by the token server and to a transaction processing computer, the authorization request message that includes the credential and the transaction input value;
determining, by the transaction processing computer, an authorizing entity computer associated with the credential;
transmitting, by the transaction processing computer and to the authorizing entity computer associated with the credential, the authorization request message;
processing, by the authorizing entity computer, the authorization request message associated with the transaction request in accordance with the transaction input value based on the preauthorization for the threshold transaction input value;
generating, by the authorizing entity computer, an authorization response message including the credential;
transmitting, by the authorizing entity computer and to the transaction processing computer, the authorization response message;
transmitting, by the transaction processing computer and to the token server, the authorization response message;
replacing, by the token server, the credential in the authorization response message with the token; and
transmitting, by the token server and to the resource provider computer, the authorization response message that includes the token.

2. The method of claim 1, further comprising:
sending a completion message for the transaction request to the communication device.

* * * * *